(12) United States Patent
Huelsen et al.

(10) Patent No.: US 12,515,595 B2
(45) Date of Patent: Jan. 6, 2026

(54) SENSOR MODULE TO BE MOUNTED ON A MOTOR VEHICLE IN A LENGTH-ADAPTIVE MANNER

(71) Applicant: Webasto SE, Stockdorf (DE)

(72) Inventors: Michael Huelsen, Stockdorf (DE); Magnus Sviberg, Stockdorf (DE); Alexander Kilias, Stockdorf (DE); Cédric Langlais, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 94 days.

(21) Appl. No.: 18/501,656

(22) Filed: Nov. 3, 2023

(65) Prior Publication Data

US 2024/0149798 A1 May 9, 2024

(30) Foreign Application Priority Data

Nov. 8, 2022 (DE) ...................... 10 2022 129 484.6

(51) Int. Cl.
*B60R 11/04* (2006.01)
*B60R 11/00* (2006.01)

(52) U.S. Cl.
CPC ......... *B60R 11/04* (2013.01); *B60R 2011/004* (2013.01); *B60R 2011/0084* (2013.01)

(58) Field of Classification Search
CPC ............... B60R 11/04; B60R 2011/004; B60R 2011/0084
USPC ......................................................... 348/148
See application file for complete search history.

(56) References Cited

U.S. PATENT DOCUMENTS

| 2021/0098980 A1* | 4/2021 | Herse ...................... H02G 11/02 |
| 2022/0063515 A1* | 3/2022 | Mckendrick ............ B60R 11/04 |
| 2022/0075030 A1* | 3/2022 | D'Antonio ............ G01S 17/931 |

FOREIGN PATENT DOCUMENTS

| CN | 212604879 U | * | 2/2021 | ............. B60R 11/04 |
| CN | 218888610 U | * | 4/2023 | ............. H04N 23/50 |

OTHER PUBLICATIONS

Office Action issued against corresponding German Application No. 10 2022 129 484.6; mailed Jun. 19, 2023 In German with English Translation (8 pages).

\* cited by examiner

*Primary Examiner* — Behrooz M Senfi
(74) *Attorney, Agent, or Firm* — Fitch, Even, Tabin & Flannery, LLP

(57) ABSTRACT

A sensor module to be mounted on a motor vehicle in a length-adaptive manner, the sensor module may have a first module component unit, which preferably has at least one first environment sensor, at least one second module component unit, which has at least one second environment sensor, and at least one intermediate element, via which the first module component unit is coupled to the second module component unit, the intermediate element being configured to be adjustable in length as a function of a mounting position on the motor vehicle.

14 Claims, 6 Drawing Sheets

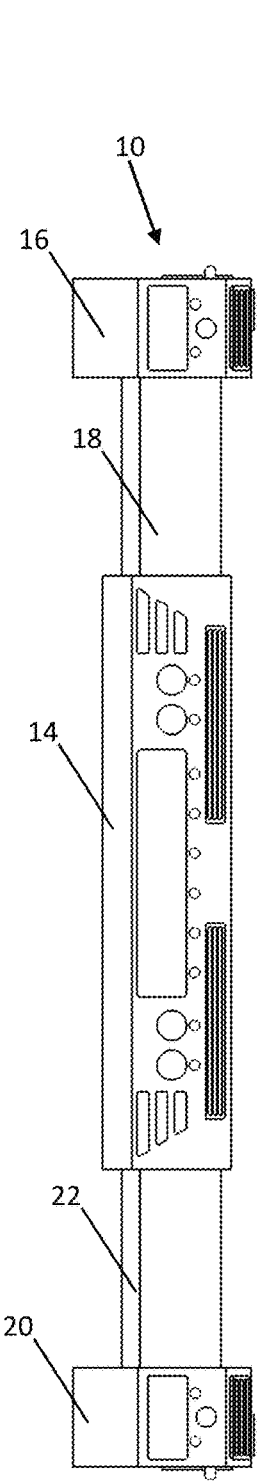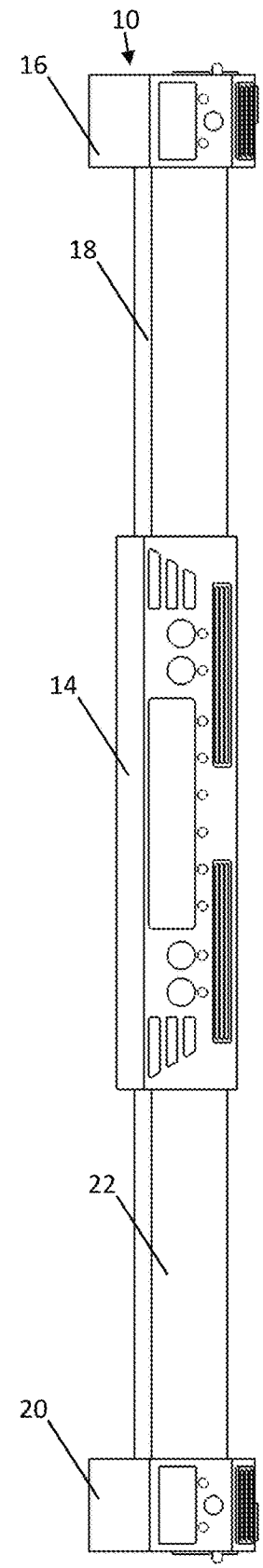
Fig. 10
Fig. 11

SENSOR MODULE TO BE MOUNTED ON A MOTOR VEHICLE IN A LENGTH-ADAPTIVE MANNER

CROSS-REFERENCE TO RELATED APPLICATION

This application claims priority from German Patent Application Number 10 2022 129 484.6, filed on Nov. 8, 2022, which is hereby incorporated herein by reference in its entirety for all purposes.

FIELD

The invention relates to a sensor module to be mounted on a motor vehicle in a length-adaptive manner according to claim 1. Furthermore, the invention relates to a motor vehicle having at least one sensor module of this kind.

BACKGROUND

Generic sensor modules have already found use in vehicle construction, as these sensor modules can be prefabricated as separate functional modules and can be delivered to the assembly line when assembling the vehicle. In the prior art, a sensor module of this kind is usually disposed on the outside of a vehicle skin. Alternatively or additionally, it is known that sensor modules are disposed on the vehicle body so as to be retractable and extendable, for example to meet optical design requirements.

Sensor modules of this kind have become increasingly important, especially in autonomous and/or partially autonomous and/or monitored motor vehicles. In order to enable the vehicle control system to control the motor vehicle autonomously and/or semi-autonomously and/or with monitoring, a large number of environment sensors (e.g. lidar sensors, radar sensors, (multi-) cameras, etc., together with other (electrical) components) is used to chart the environment surrounding the motor vehicle and to determine a traffic situation, for example, from the recorded environment data. For this purpose, known sensor modules can be equipped with a large number of environment sensors. The known environment sensors transmit and/or receive electromagnetic signals, for example laser beams or radar beams, a data model of the vehicle environment being generated by signal evaluation and being able to be used for vehicle control.

The known sensor modules can be equipped with a number of other functional components to enable, for example, controlling the temperature, in particular cooling, of an environment sensor and/or cleaning a viewing area of the environment sensor and/or de-icing the viewing area. Functional components of this kind can also be provided, for example, outside the sensor module on other parts of the vehicle body.

The sensor modules for monitoring and detecting the vehicle environment are usually mounted on the vehicle roof, since the vehicle roof is usually the highest point on a vehicle from and offers the best vantage point for viewing the vehicle environment. However, a variety of other mounting positions for such sensor modules are also known. For example, known sensor modules can be disposed in the area of a bumper and/or in the area of a front header above the windshield and/or at the rear in the area around a rear window or in lateral areas of the vehicle body in order to view and/or detect the vehicle environment as comprehensively as possible. In addition, existing installation spaces in a motor vehicle can also be used to integrate sensor modules and/or other functional components. Installation spaces of this kind can be present, for example, in spoilers and/or vehicle mirrors and/or in roof boxes, in particular in vans and/or trucks. However, known arrangements and/or integrations of sensor modules-depend on the vehicle type and therefore have to be developed and/or manufactured individually for each vehicle type and possibly also for each model from a model series. Such individualized development and/or production requires optimization, particularly in terms of costs.

In particular for the roof area of motor vehicles, roof modules are known which can comprise several sensor modules and/or environment sensors and are usually mounted to the roof of the vehicle body as a unit. The applicant, for example, offers roof modules of this kind for various types of motor vehicle. However, such roof modules also have to be developed and/or manufactured depending on the vehicle type, as they have to be adapted to the respective vehicle conditions and/or vehicle dimensions.

Overall, known sensor modules and/or roof modules are thus limited to a particular vehicle model and cannot, for example, be universally prefabricated for a large number of vehicle types. For example, when changing between vehicle models and/or vehicle types, far-reaching geometric and/or design changes are usually necessary to adapt a sensor module and/or a roof module to the new vehicle model and/or the new vehicle type. In addition, the design adaptation of the sensor modules is often limited due to external design specifications and/or a specific arrangement position of the sensor module on the motor vehicle and/or due to local installation space restrictions of the motor vehicle and/or due to restrictive vehicle dimensions, meaning it may not be possible to optimally position the sensor module on the vehicle in order to chart the vehicle environment with as little interference as possible. This in turn may mean that a respective environment sensor can only chart the vehicle environment suboptimally. Thus, in the case of known sensor modules and/or roof modules for each vehicle, high costs are incurred for the development and/or design and/or production of a sensor module and/or roof module of this kind, which in particular has a negative impact on availability for the mass market.

SUMMARY

Due to the disadvantages and problems mentioned above, one object of the invention is to propose a further developed sensor module by means of which the disadvantages mentioned above are overcome and, in particular, a simplified and/or more cost-effective mounting option for mounting the sensor module on a motor vehicle is created, which, in particular, does not depend on a respective vehicle type and/or a respective vehicle model.

The object is attained by a sensor module having the features of independent claim 1.

Advantageous embodiments of the invention are the subject matter of the dependent claims. Any and all combinations of at least two features disclosed in the description, the claims, and/or the figures fall within the scope of the invention. Naturally, the explanations given in connection with the sensor module equivalently relate to the motor vehicle according to the invention and vice-versa, without being mentioned separately in its context. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

According to the invention, a sensor module to be mounted on a motor vehicle in a length-adaptive manner is claimed. The sensor module comprises a first module component unit, which preferably has at least one first environment sensor. Furthermore, the sensor module comprises at least one second module component unit, which comprises at least one second environment sensor, and at least one intermediate element, by means of which the first module component unit is coupled to the second module component unit. The intermediate element is designed to be adjustable in length, in particular as a function of a mounting position on the motor vehicle.

Naturally, the sensor element according to the invention can be manufactured and/or produced and/or distributed and/or marketed as the smallest economic unit independently of a respective motor vehicle, meaning the scope of protection sought herein concentrates in particular on this smallest economic unit, without, however, neglecting the scope of protection for a motor vehicle with at least one such sensor module. The naming of the motor vehicle in claim 1 serves merely to clarify the design of the sensor module according to the invention in order to indicate its functional scope and/or interaction with the motor vehicle.

The sensor module according to the invention can simplify a vehicle design and/or a sensor module design, since an adaptable sensor module can be developed and/or manufactured in particular independently of a respective vehicle type and/or vehicle model and/or a respective mounting position on the motor vehicle. In this manner, a sensor module according to the invention can be prefabricated, in particular as a structural unit, and can be attached at different mounting positions almost independently of a vehicle design. According to the invention, the sensor module merely needs to be adjusted in length, in particular by adjusting and/or adapting and/or matching a length of the intermediate element, also referred to as a connecting element, for the individual mounting. This can simplify a vehicle layout, since accommodation of a sensor module no longer has to be considered individually. Likewise, or concomitantly, an installation space distribution of the vehicle can be simplified or improved. In addition, the customizable mounting of the sensor module according to the invention can optimize a field of view for the respective environment sensor, since the sensor module can be disposed in an optimal position for the environment sensor on the respective motor vehicle. Overall, the modularity for mounting sensor modules on different motor vehicles is improved. In addition, according to the invention, only minimal adjustments, in particular only a length adjustment, are necessary to adapt a sensor module according to the invention to different vehicles and/or to different vehicle positions. Constructive changes to the sensor module are no longer necessary according to the invention. This leads to high cost savings in the development and/or design and/or production of the sensor modules according to the invention. As a result, a scale effect can be achieved, making the sensor modules according to the invention accessible to the mass market. In addition, the sensor modules according to the invention bear great advantages for being retrofitted to motor vehicles, for example for retrofitting vehicles for the provision of autonomous and/or semi-autonomous and/or monitored driving functions, since the sensor modules only have to be adapted in length to the respective motor vehicle and/or the respective mounting position. This simplifies the possibility of a retrofit and makes it more cost-effective.

The sensor module according to the invention, in particular one adaptable in length, therefore provides a means of keeping a standardized sensor module available for different vehicle types and/or vehicle models and/or mounting positions. The sensor module according to the invention can be mounted to different vehicle positions without the need for large adjustments. Particularly preferably, a sensor module of this kind can be disposed, for example, on a cab overhang of a truck, in particular in the area of a cargo box, since these vehicle areas often have a standardized and/or only dimensionally varying size, in particular having nearly rectangular cross sections. In this manner, the sensor modules according to the invention can be mounted particularly easily. Preferably, the sensor module is disposed in a planar and/or flat area of the vehicle body, in particular on an outer skin of the vehicle body. In principle, the outer skin of the vehicle can also comprise at least one curvature in the mounting position. In this case, it is preferred if the sensor module also comprises a curvature along its length which is complementary to this in order to be disposed as flush as possible with the outer skin. In principle, it is also possible to dispose the sensor module in an interior area of the vehicle body, for example in an interior roof area.

The module component units can comprise a plurality of environment sensors, the environment sensors being able to differ from one another in terms of their type and/or their mode of operation in order for the environment sensors to chart as holistic an image as possible of the vehicle environment. Preferably, the respective module component units are functionally independent of each other, so that each of the module component units can detect the vehicle environment on its own. In this manner, the sensor module can be adaptively adjusted in length, so that preferably one module component unit is disposed in a corresponding end region of the sensor module, viewed in its length. In this manner, the corresponding module component unit is located in a corresponding corner region of the vehicle roof, for example in the case of a front and/or rear arrangement of the sensor module on a vehicle roof, in particular parallel to a vehicle width. In this arrangement, the vehicle environment can be optimally detected by the respective environment sensors, in particular without interference from the body.

The intermediate element is preferably a mechanical and/or electrical and/or electronic connection between the first and the second module component unit. Particularly preferably, the intermediate element serves as a carrier component on which the module component units are disposed. In principle, two of a plurality of module component units can each be connected and/or coupled to one another by an intermediate element.

It is understood that all embodiments pertaining to one module component unit also apply to other module component units without being mentioned redundantly. It is understood that all embodiments pertaining to one environment sensor also apply to other environment sensors without being mentioned redundantly. It is understood that all embodiments pertaining to one intermediate element also apply to other intermediate elements without being mentioned redundantly. This applies in each case to the preceding as well as to the following embodiments.

In a preferred embodiment, the sensor module is in particular essentially beam-shaped. Alternatively or additionally, the sensor module in particular has a length which is greater than its width. Alternatively or additionally, the sensor module is adaptively adjustable as a whole, in particular by adjusting the length of the intermediate element along the length of the sensor module. In this manner, the sensor module can be individually adapted to a corresponding vehicle type and/or to a corresponding vehicle model and/or to a corresponding vehicle position without requiring a design change of the sensor module. In this context, "essentially beam-shaped" means the overall visual impression of the sensor module is similar to a beam, i.e. in particular that one extension of the sensor module (its length) is greater than the other two extensions (width and height), so that the sensor module extends longitudinally.

In a preferred embodiment, the at least one intermediate element can be adjusted telescopically in length and be adaptively adjustable in this manner to a vehicle dimension as a function of the mounting position on the motor vehicle. Due to the telescopic adjustability of the intermediate element, a length of the sensor module can be adapted individually and in a technically simple manner. In addition, telescopic adjustability is optimized in terms of installation space compared to other technical designs for adjusting a length, which is advantageous for the vehicle sector.

In a preferred embodiment, the second module component unit is disposed at an end face of the intermediate element. If the sensor module comprises two module component units, the other module component unit is preferably also disposed at an end face, in particular at an opposite end of the intermediate element. This arrangement of the module component units preferably means that a viewing area of a corresponding environment sensor is not impaired when the sensor module is disposed on a motor vehicle, since the respective module component unit is preferably disposed in an edge region of the vehicle body, in particular on the outside.

In a preferred embodiment, the sensor module has a third module component unit, which preferably comprises at least one third environment sensor, and at least one other intermediate element, via which the first module component unit is coupled to the third module component unit, the other intermediate element being configured to be adjustable in length, in particular as a function of a mounting position on the motor vehicle. Embodiments pertaining to the intermediate element apply in the same manner to the other intermediate element, without being mentioned redundantly in the claims and/or the present description. By means of the two intermediate elements, the sensor module can, for example, be extended at each end, viewed in its length, in order to displace the sensor module in its length. The intermediate elements can preferably be telescopically extended and retracted. This enables simple adjustability.

It may be preferred that the first module component unit or one of the first to third module component units be disposed centrally between the two other module component units, and in particular be coupled to the corresponding module component unit via the intermediate elements. The first module component unit or another of the module component units does not necessarily have to comprise an environment sensor. One of the module component units, preferably the one disposed between the other module component units, can preferably comprise other technical components, such as components of a cooling system and/or a cleaning system and/or another system, instead of or in addition to an environment sensor.

In a preferred embodiment, the first module component unit is disposed in a central and/or middle area relative to the length of the sensor module. Preferably, the intermediate element and the other intermediate element each extend away from the first module component unit in length.

Preferably, the second module component unit is disposed at the end face of the intermediate element. Preferably, the third module component unit is disposed at the end face of the further intermediate element. In this manner, the sensor module is beam-shaped. The first module component unit is disposed centrally and can, for example, chart a central area of the vehicle environment, viewed in a movement direction and/or in an opposite direction. The two other module component units, on the other hand, are each disposed at the end face and can thus detect corner areas and/or side areas and/or only parts of a central field of view. The at least one first environment sensor preferably detects the central field of view around a movement direction and/or around an opposite direction. The at least one second environment sensor and/or the at least one third environment sensor preferably also charts a lateral field of view transverse to the movement direction and/or the opposite direction. The at least one second environment sensor and/or the at least one third environment sensor can also detect partial areas of the central field of view in order to enable, for example, redundant detection of the vehicle environment in particularly important areas.

In a preferred embodiment, the at least one second and/or the at least one third environment sensor are oriented essentially, i.e. with a deviation of ±20%, in movement direction and/or essentially, i.e. with a deviation of ±20%, in the opposite direction and/or essentially, i.e. with a deviation of ±20%, along the length of the sensor module. In this manner, depending on the environment sensor, a vehicle environment can be charted in a field of view extending essentially around the movement direction and/or around the opposite direction and/or around the length. Particularly preferably, the second and/or the third module component unit comprises a plurality of environment sensors which can have different orientations and thus different fields of view in order to chart the vehicle environment as comprehensively as possible. For example, some environment sensors may be oriented transverse to the movement direction, e.g., essentially parallel to the length of the sensor module, whereas other environment sensors may be oriented parallel to the movement direction and/or the opposite direction. The environment sensors in the first module component unit are preferably oriented essentially, i.e. with a deviation of ±20%, parallel to the movement direction and/or to the opposite direction.

In a preferred embodiment, the at least one first environment sensor and/or the at least one second environment sensor and/or the at least one third environment sensor comprises at least one lidar sensor and/or at least one ultrasonic sensor and/or at least one camera and/or at least one multidirectional camera and/or at least one radar sensor. Other sensor types are also conceivable in principle.

In a preferred embodiment, the first module component unit and/or the second module component unit and/or the third module component unit comprise at least one temperature-control apparatus and/or at least one control apparatus and/or at least one amplifier and/or at least one optical apparatus and/or at least one cleaning apparatus and/or at least one de-icing apparatus and/or at least one anti-fog apparatus and/or at least one illumination apparatus and/or at least one antenna and/or at least one communication apparatus and/or at least one energy-generator and/or at least one energy-storage apparatus and/or further electrical and/or electronic and/or mechanical components.

A temperature-control apparatus of this kind preferably comprises at least one heat conduction channel or cooling channel (see descriptions above) and/or at least one heat transfer element and/or at least one fan and/or at least one heat exchanger and/or at least one heat conduction pipe (also referred to as heat pipe). The temperature-control apparatus is adapted to air-condition or control the temperature of the at least one environment sensor (or maintain a predetermined (operating) temperature thereof). For providing this additional temperature-control function for the at least one environment sensor, the temperature-control apparatus is preferably connected to the at least one environment sensor via at least one heat conduction interface. This provides a temperature-control function for the at least one environment sensor, which ensures operational safety of the at least one environment sensor during operation and, in particular, prevents overheating.

A control apparatus of this kind can preferably control one or more functions of the at least one environment sensor and/or further components. In particular, the control apparatus can execute software, for example by a processor, one or more functions of the at least one environment sensor being controlled by the software. For instance, the control apparatus can also receive software updates for example via a communication interface of the motor vehicle (see also above explanations), so that a functional scope of the at least one environment sensor can be expanded with a software update of this kind.

An amplifier apparatus of this kind may preferably be configured to amplify a transmitting power and/or a receiving power of the at least one environment sensor and/or an antenna, thereby improving its/their performance. The amplifier apparatus may comprise, for example, a signal amplifier or the like.

An optical apparatus of this kind may, for example, comprise a viewing area in the form of a window and/or a lens and/or another optical element. The optical apparatus is preferably designed to provide a viewing area for the at least one environment sensor, through which the at least one environment sensor can look in order to receive electromagnetic and/or optical signals from a vehicle environment and/or to transmit electromagnetic and/or optical signals into the vehicle environment. The optical apparatus may be designed to extend a field of view or an angle of view of the at least one environment sensor and/or to restrict it to a predetermined charting range. This may be provided, for example, by a lens or similar optical element. In the simplest case, the optical apparatus may comprise a window through which the at least one environment sensor can look. In such a case, it is preferred if the at least one environment sensor is disposed in a casing in which the window and/or the viewing area is included.

A cleaning apparatus of this kind preferably comprises at least one cleaning nozzle, through which a viewing area of the at least one environment sensor can be cleaned. The cleaning nozzle is preferably designed to eject a cleaning fluid. The cleaning fluid can be liquid and/or gaseous and/or contain at least a proportion of solids. The at least one cleaning nozzle can be movable. The cleaning apparatus can comprise further cleaning components, in particular cleaning lines and/or a fluid tank and/or a pump and/or a compressor and/or valves.

Such a de-icing apparatus and/or anti-fog apparatus can preferably be disposed at a viewing area of the corresponding at least one environment sensor in order to de-ice it and/or to free it from moisture-induced fogging. This can be made possible, for example, by heating wires integrated in the viewing area.

An illumination apparatus of this kind can preferably comprise at least one light source, in particular at least one LED. The illumination apparatus preferably serves for visual communication of the vehicle with persons located in the vehicle environment.

An antenna and/or communication apparatus of this kind can preferably be designed to receive data from outside the motor vehicle and/or to transmit data to a vehicle environment. The antenna and/or communication apparatus can, for example, be configured to communicate with a server or a cloud, from which data can be retrieved and/or on which data can be stored. The communication interface can be, for example, a WLAN interface and/or a radio interface and/or a GPS interface and/or a Bluetooth interface.

An energy generator of this kind can, for example, be designed to generate at least one electrical energy required for operation of the sensor module and/or to convert it from one form of energy (e.g. solar energy) to electrical energy. For instance, the energy generator may comprise at least one photovoltaic cell, through which solar energy can be converted to electrical energy. Preferably, the energy generator comprises power electronics and/or a DC/DC converter and/or an AC/DC converter. Thus, a required voltage level or power level can preferably be provided on a component-specific basis. The power generation device makes it possible, for example, to provide at least some of the power required for operating the sensor module, so that, for example, an energy store (e.g. a traction battery) required for driving the motor vehicle is relieved and the motor vehicle thus has a greater range. In addition, this makes it possible to design the sensor module as a self-sufficient module that is not necessarily dependent on a power supply on the vehicle side.

An energy storage apparatus of this kind can be designed, for example, as a battery and/or as a supercapacitor. In this manner, it is possible to temporarily store energy generated by the preferred energy generator in order to supply the respective environment sensor and/or further components with electrical energy even if, for example, the energy generator cannot generate any energy. In principle, it is also possible for only a battery management system to be included as a functional apparatus in the sensor module and for further parts of the energy storage apparatus, for example the battery cells and/or the supercapacitors, to be included in other areas of the motor vehicle.

Naturally, the sensor module can also comprise at least one interface to the motor vehicle in order to be supplied with electrical energy and/or with other media, such as compressed air and/or cooling air, via this interface.

In a preferred embodiment, the sensor module comprises at least one electric and/or electronic connection, in particular a plurality of cables, which extends between the first and/or the second and/or the third module component unit, the intermediate element and/or the other intermediate element forming an interconnection, in particular a cable guide, and/or a line guide and/or a channel guide which is flexible and/or adjustable in length. This makes it possible to guide the connections and/or cables in a manner which optimizes installation space. The intermediate elements are preferably at least partially hollow for this purpose.

In a preferred embodiment, the sensor module comprises at least one drive apparatus configured to displace the intermediate element and/or the other intermediate element telescopically in length. This drive apparatus can be a linear drive, for example, which enables telescopic adjustment of the intermediate elements. Alternatively or additionally, the intermediate elements can also be moved manually or partially manually.

In a preferred embodiment, the sensor module comprises at least one snap device and/or at least one fixation device, which are configured to fixate the intermediate element and/or the other intermediate element and/or the corresponding module component unit in length, in particular along the length. Thus, after the length has been set or adjusted by the snap device and/or the fixation device, the length can be fixated. This can take place by snapping and/or screwing and/or pressing and/or locking.

The invention further relates to a motor vehicle comprising at least one sensor module according to any embodiment, the at least one sensor module being mounted in a mounting position on the motor vehicle, the intermediate element being adjusted in such a manner in length of the sensor module that the sensor module is adjusted to a vehicle dimension in the mounting position.

The motor vehicle preferably comprises a motor vehicle body. The sensor module according to any embodiment preferably forms a structural unit which can be adapted to a corresponding vehicle dimension, in particular to a corresponding width and/or to a corresponding length of the vehicle body, in different mounting positions of a motor vehicle by adjusting the length of the sensor module and can thus be adaptively mounted on the vehicle body. This makes it possible to design the sensor module independently of a corresponding vehicle model and/or vehicle type and to adapt it individually to a corresponding vehicle by adjusting the length. According to the invention, it is preferred to mount the sensor module in a front-side and/or a rear-side and/or a lateral roof area of a vehicle and/or in the area of a bumper and/or an engine hood and/or in the area of a step.

The sensor module according to the invention can in principle be disposed at any location of a motor vehicle and can be designed for different purposes. The motor vehicle may preferably be a passenger car, a truck, a transport vehicle, a rail vehicle, an autonomous or semi-autonomous driving vehicle, a passenger transport vehicle, a troop vehicle or the like. In the present context, the term vehicle is used synonymously with the term motor vehicle.

Particularly preferably, a motor vehicle comprises at least two sensor modules according to the invention, with one of the sensor modules preferably being disposed at the front and the other at the rear. The environment sensors of the front sensor module preferably look in the direction of movement and/or in a right-hand and/or left-hand vehicle environment. The environment sensors of the rear sensor module preferably look in the opposite direction and/or in a vehicle environment on the right and/or left. In this manner, an entire vehicle environment, in particular around the corresponding motor vehicle, can be detected.

Of course, the embodiments and the illustrative examples mentioned above and yet to be discussed below can be realized not only individually but also in any combination with each other without departing from the scope of the present invention. Moreover, any and all embodiments and illustrative examples of the sensor module also relate to a panel component, in particular a roof module, comprising such a sensor module and to a motor vehicle having such a panel component, in particular such a roof module.

BRIEF DESCRIPTIONS OF THE DRAWINGS

Embodiments of the invention are shown schematically in the drawings and are explained below by way of example.

FIG. 10 shows a schematic view of a sensor module in a first length; and

FIG. 11 shows a schematic view of a sensor module in a second length.

DETAILED DESCRIPTION

Figure 1:
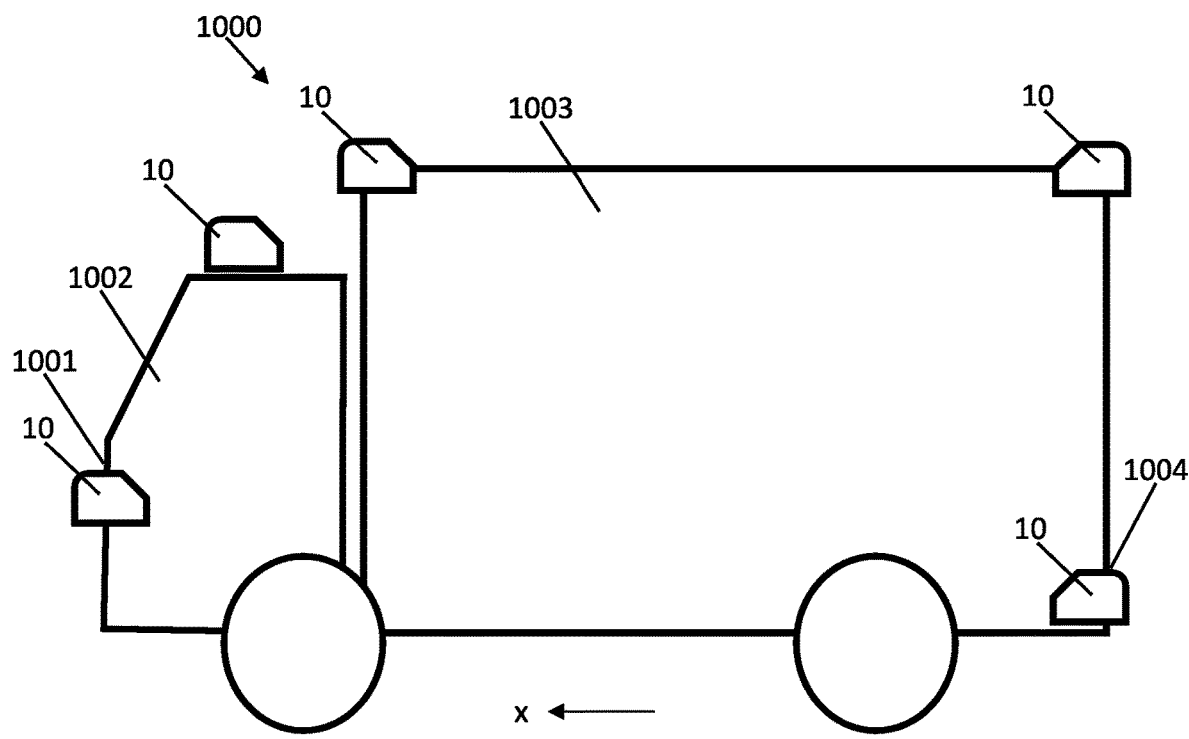
FIG. 1 shows a schematic lateral view of a motor vehicle having a plurality of sensor modules.

FIG. 1 shows a motor vehicle 1000. In this instance, the motor vehicle 1000 comprises a plurality of sensor modules 10 which are designed to be disposed on the motor vehicle 1000, in particular on a vehicle body. The sensor modules 10 are each designed to be adaptive in length, with each sensor module 10 being an identical sensor module 10. According to FIG. 1, a sensor module 10 is disposed in the area of a front bumper 1001. According to FIG. 1, a sensor module 10 is disposed in a front roof area of the vehicle, in particular directly above a driver's cab 1002. According to FIG. 1, a sensor module 10 is disposed in a front-side area of a load box 1003 of the motor vehicle 1000. According to FIG. 1, a sensor module 10 is disposed in a rear-side region of the load box 1003 of the motor vehicle 1000. According to FIG. 1, a sensor module 10 is disposed in a rear-side region, in particular on a rear-side bumper 1004 of the motor vehicle 1000. In the present case, the motor vehicle 1000 is a truck. Other arrangement positions are also conceivable for the sensor modules 10.

Figure 2:
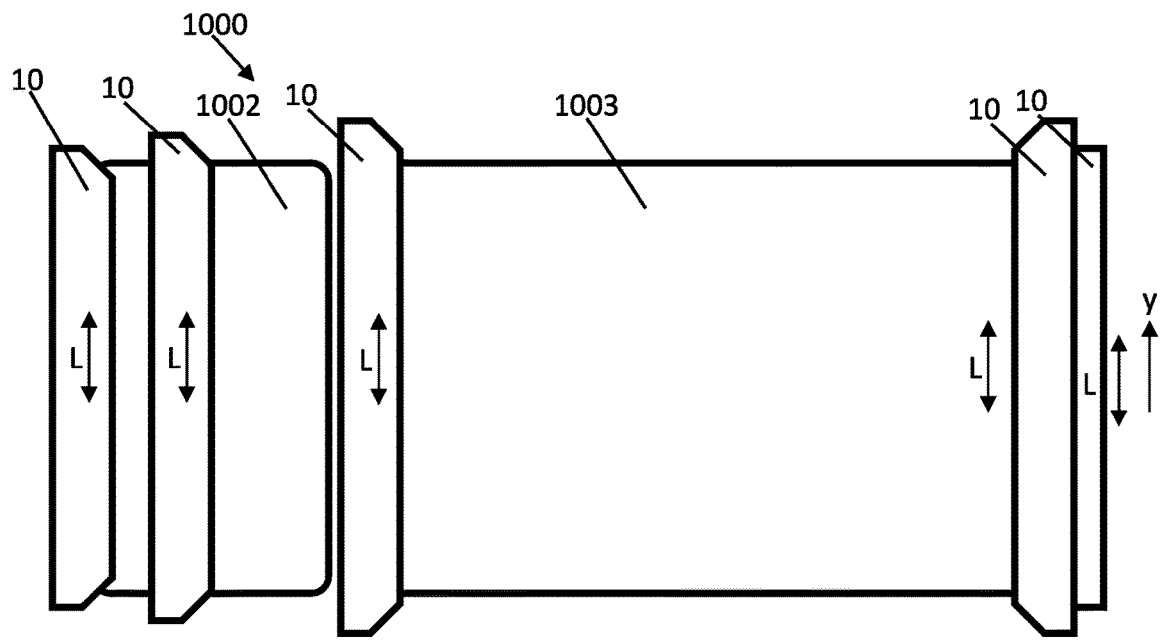
FIG. 2 shows a schematic top view of a motor vehicle having a plurality of sensor modules.

From FIG. 2, which shows a top view of the motor vehicle 1000 of FIG. 1, it can be clearly seen that, depending on the mounting position, a length of the corresponding sensor module 10 is adapted to a corresponding prevailing vehicle width, as viewed in a vehicle width y, which is orthogonal to a vehicle length x, and/or is adjusted in length to the corresponding vehicle width. Here, a length L of the corresponding sensor module 10 is adapted to the corresponding vehicle width.

Figure 3:
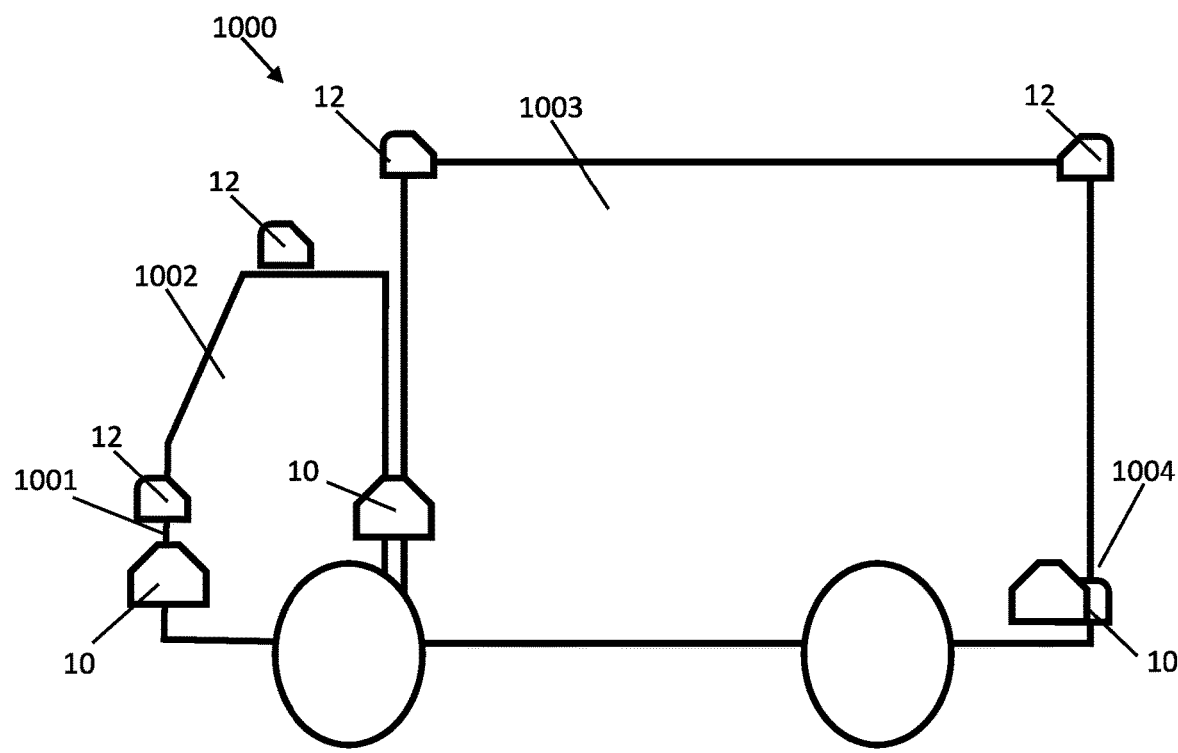
FIG. 3 shows a schematic lateral view of a motor vehicle having a plurality of sensor modules.
Figure 4:
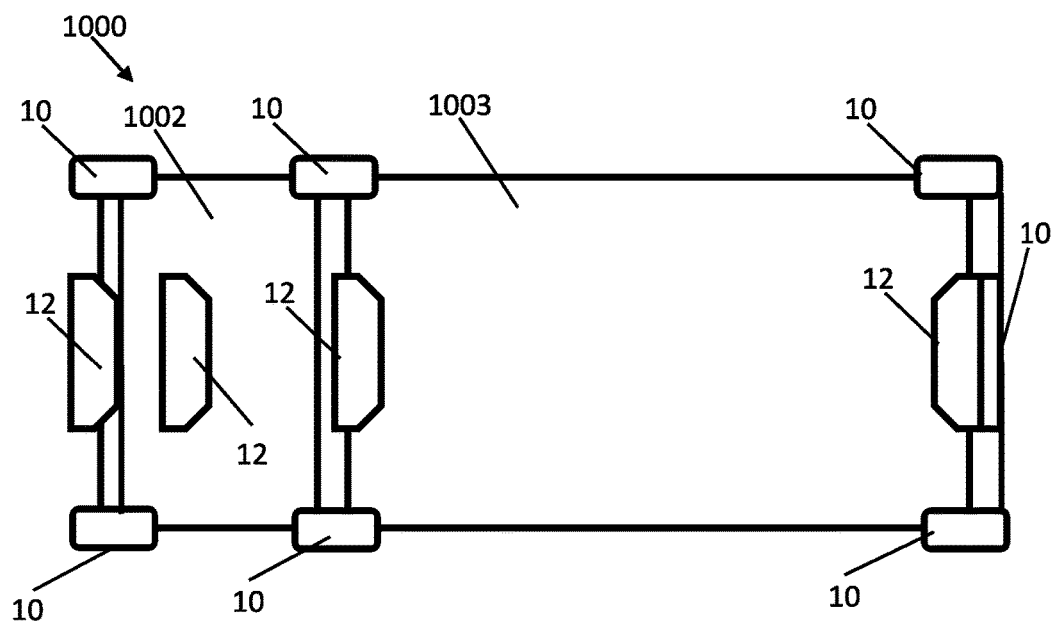
FIG. 4 shows a schematic top view of a motor vehicle having a plurality of sensor modules.

FIGS. 3 and 4 show a second exemplary embodiment of the motor vehicle 1000, in which, in addition to the sensor module 10 according to the invention, other sensor module units 12 are disposed at other mounting positions of the motor vehicle 1000 in comparison to the exemplary embodiment in FIGS. 1 and 2. The sensor module units 12 are, for example, conventional sensor module units 12 as known from the prior art. The sensor module units 12 are not length-adaptable sensor modules 10, as are the focus of the present application. However, a combination of sensor modules 10 according to the invention and known sensor module units 12 may be preferred if, for example, a motor vehicle is to be retrofitted in retrospect in order to further improve charting a vehicle environment, for example.

In the vehicle shown in FIGS. 3 and 4, for example, several conventional sensor module units 12 are fitted at various positions on the motor vehicle 1000, in this case in the area of the front bumper 1001, in the front roof area of the driver's cab 1002 and in the front and rear roof areas of the load box 1003. In addition, the motor vehicle 1000 is supplemented according to the invention by three further length-adaptable sensor modules 10. One sensor module 10 is mounted in the area of the front bumper 1001. Another sensor module 10 is mounted in an area between the driver's cab 1002 and the load box 1003. Yet another sensor module 10 is mounted in a rear, ground-side region of the rear bumper 1004. The motor vehicle 1000 was, for example, subsequently supplemented by the sensor modules 10 according to the invention in order to subsequently improve charting the vehicle environment compared to charting the vehicle environment only with the already existing sensor module units 12.

Figure 5:
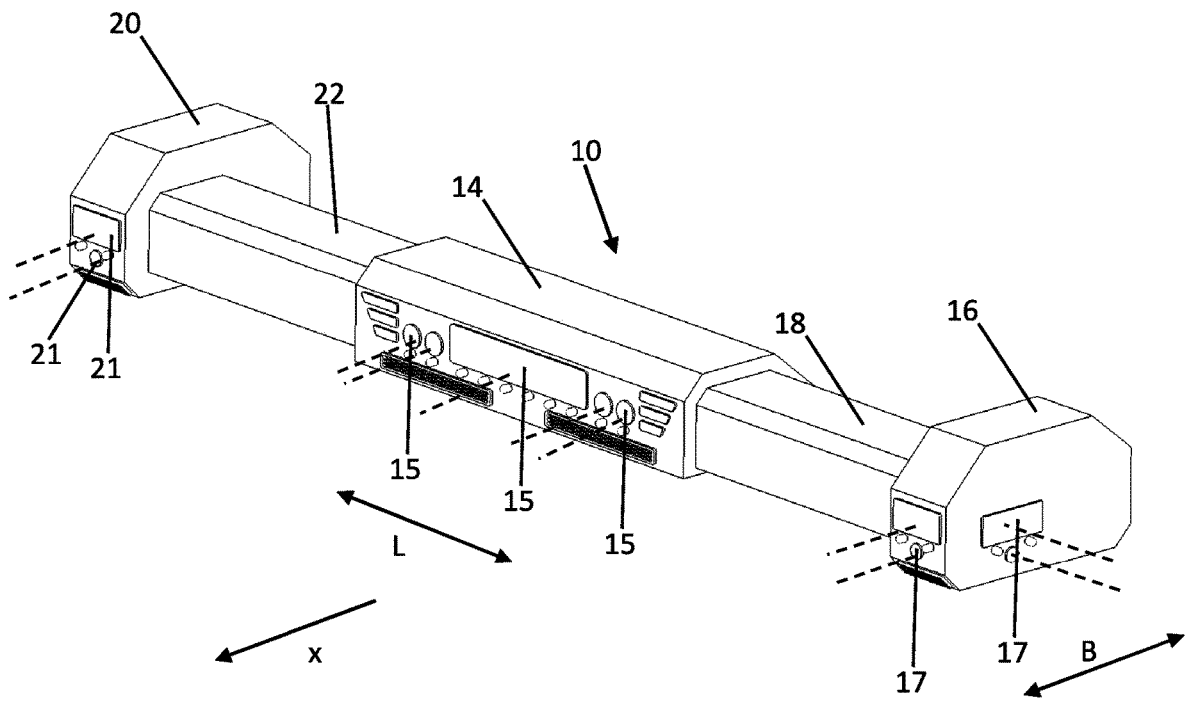
FIG. 5 shows a schematic view of a sensor module.

FIG. 5 shows an embodiment of the sensor module 10 according to the invention. The sensor module 10 comprises a first module component unit 14, which comprises at least one first environment sensor 15, at least one second module component unit 16, which comprises at least one second environment sensor 17, and at least one intermediate element 18, by means of which the first module component unit 14 is coupled to the second module component unit 16.

The intermediate element 18 is configured to be adaptable in length, particularly as a function of a mounting position on the motor vehicle 1000, as exemplified by FIGS. 10 and 11. The sensor module 10 further comprises a third module component unit 20, which comprises at least one third environment sensor 21, and at least one other intermediate element 22, by means of which the first module component unit 14 is coupled to the third module component unit 20, the other intermediate element 22 being designed to be adaptable in length, in particular as a function of a mounting position on the motor vehicle 1000.

The modules component unites 14, 16, 20 each comprise several different environment sensors 15, 17, 21. For instance, the module component units 14, 16, 20 comprise several lidar sensors and/or several cameras and/or several ultrasonic sensors and/or several multi-cameras.

As can be seen in FIG. 5, the sensor module 10 is essentially beam-shaped and extends along its length L, which is larger than its width B. The sensor module 10 is adaptive in length along the length L. For this purpose, the at least one intermediate element 18 and the further intermediate element 22 are each telescopically adaptable in length. In this manner, the sensor module 10 can be adapted to a vehicle dimension, in particular to the vehicle width y, depending on the mounting position on the motor vehicle 1000.

As can be seen from FIG. 5, the second and third module component units 16, 20 are disposed at the end face of the intermediate element 18 and/or the other intermediate element 22. The first module component unit 14, on the other hand, is provided in a central, in particular middle area of the sensor module 10. The two intermediate elements 18, 22 thus extend away from the first module component unit 14, in particular in the length L on the right and left side. The first environment sensors 15 are oriented in such a manner that their corresponding field of view is preferably oriented transversely to the length L. A corresponding optical axis of the corresponding first environment sensor 15 is preferably oriented essentially orthogonal to the length L. In this manner, the first environment sensors 15 can chart a central field of view around the movement direction x and/or around the opposite direction (in the case of a rear arrangement of the sensor module 10).

At least a part of the second and/or third environment sensors 17, 21 is preferably oriented substantially in the direction of the length L, meaning a lateral area of the motor vehicle 1000 can be charted in this manner when the sensor module 10 is mounted. Another part of the second and/or the third environment sensors 17, 21, on the other hand, may be oriented transversely to the length L, in particular essentially parallel to the first environment sensors 15. In this manner, the fields of view of some of the environment sensors 15, 17, 21 can at least partially overlap in order, for example, to redundantly chart particularly critical areas of the vehicle environment in redundant form.

The corresponding optical axes are shown as dashed lines in FIG. 5 as an example, but are not marked for reasons of clarity. In addition, the vehicle length x is drawn for orientation.

Figure 6:
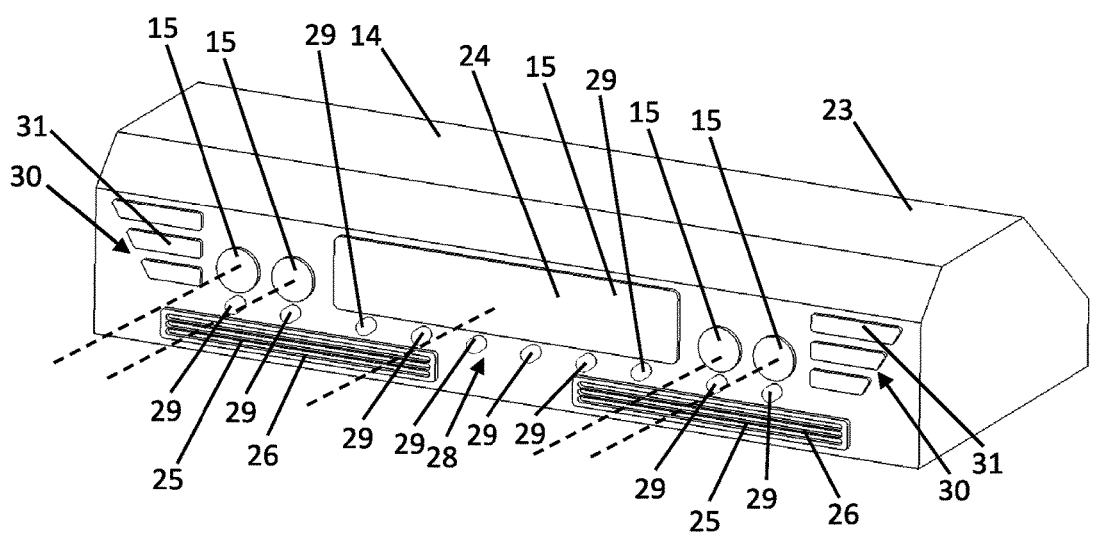
FIG. 6 shows a schematic front view of an exemplary embodiment of a first module component unit.

FIG. 6 shows the first module component unit 14 in detailed, exemplary form. The first module component unit 14 comprises a casing 23, in which the first environment sensors 15 and other components are disposed.

Figure 7:
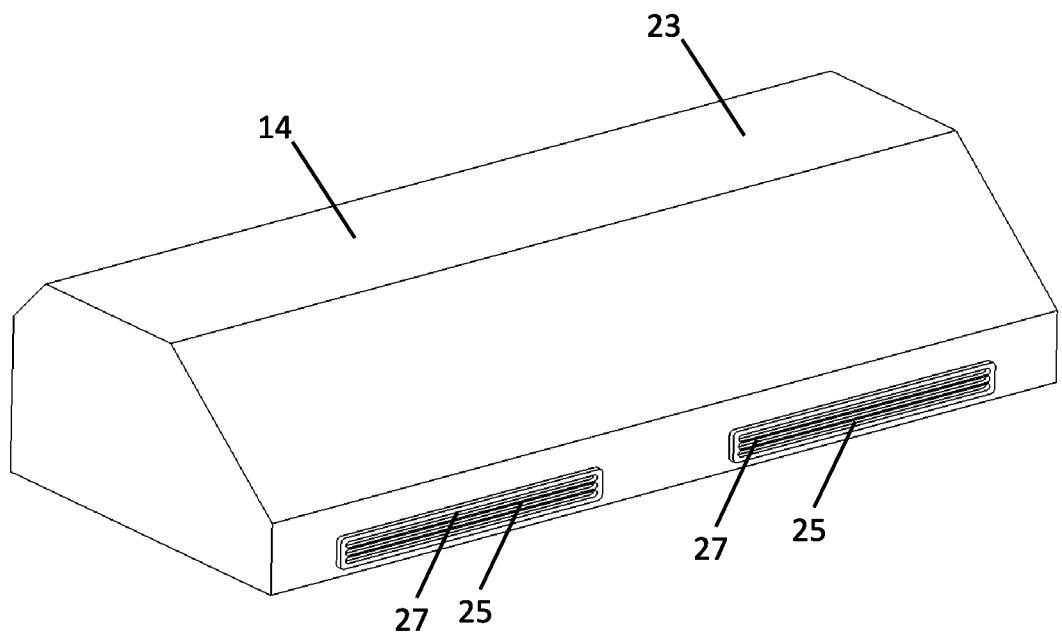
FIG. 7 shows a schematic rear view of an exemplary embodiment of a first module component unit.

The first module component unit 14 comprises, in addition to the first environment sensors 15, at least one viewing area 24, through which at least one of the environment sensors 15 looks in order to chart the vehicle environment. Furthermore, the module component unit 14 comprises a temperature-control apparatus 25, which in the present case comprises a cooling-air inlet 26 and a cooling-air outlet 27 (see FIG. 7). The corresponding cooling-air inlet 26 is disposed on the front side of the casing 23 as viewed in the vehicle length x. The corresponding cooling-air outlet 27 is disposed opposite the corresponding cooling-air inlet 26. Furthermore, the first module component unit 14 comprises a cleaning apparatus 28 with at least one cleaning nozzle 29, in this case a plurality of cleaning nozzles 29. The first module component unit 14 also comprises at least one illumination apparatus 30 having at least one light source 31, which can be designed as an LED light source, for example. The illumination apparatus 30 is designed to enable visual communication of the sensor module 10 with the outside world.

In the following, technically identical components are each given the same reference numeral.

Figure 8:
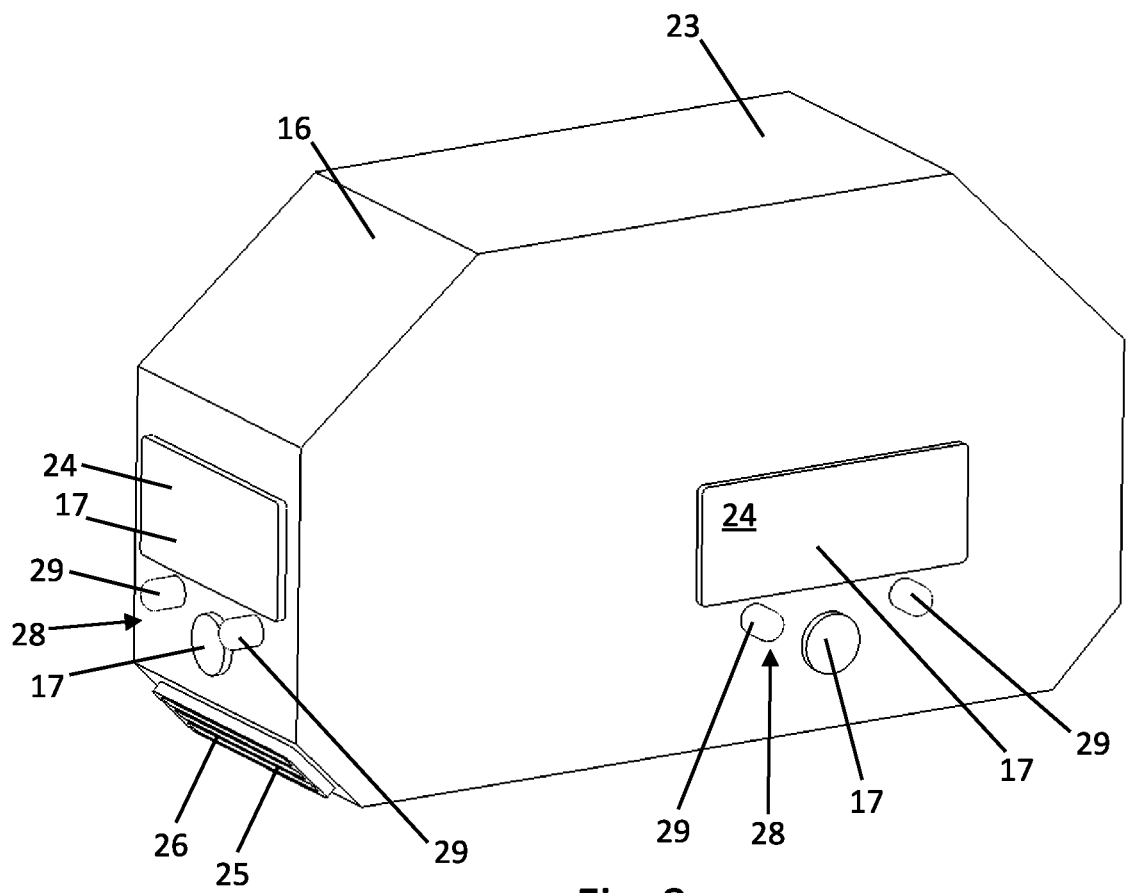
FIG. 8 shows a schematic view of an exemplary embodiment of a second and/or third module component unit.
Figure 9:
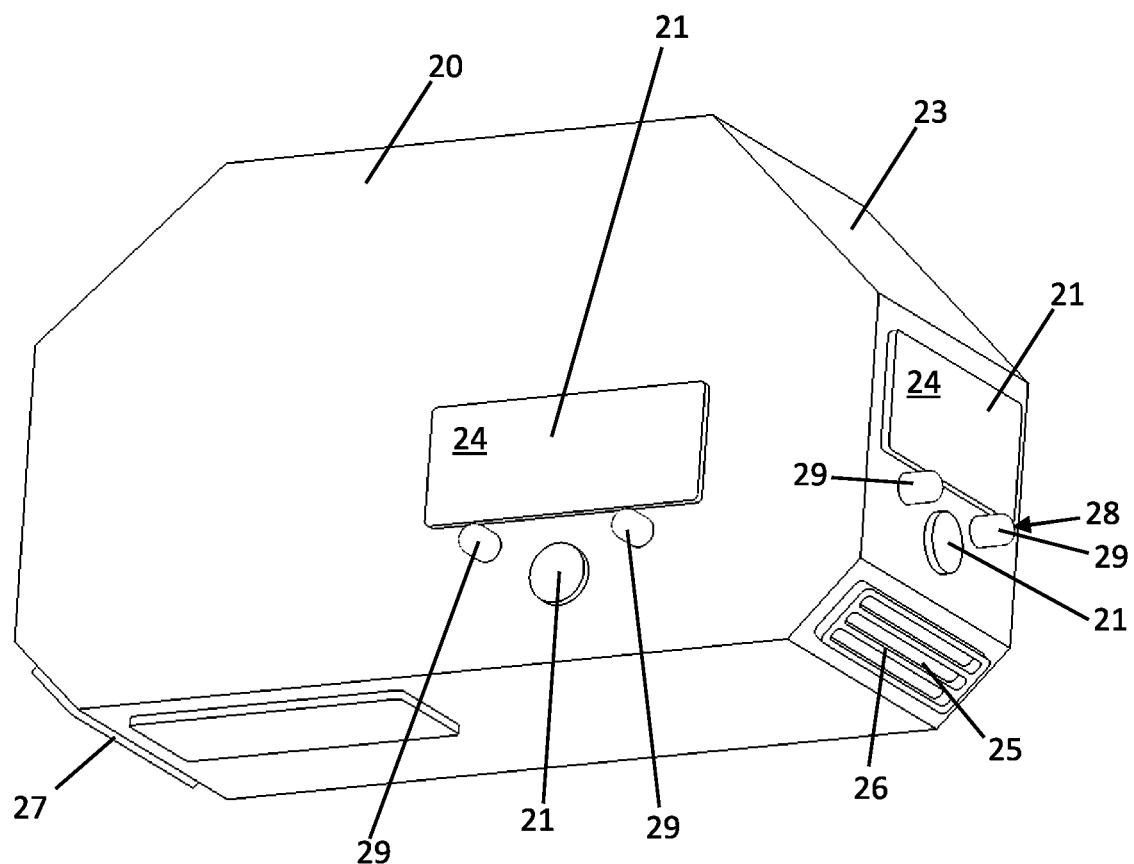
FIG. 9 shows a schematic view of an exemplary embodiment of a second and/or third module component unit.

FIGS. 8 and 9 show the second and third module component unit 16, 20. These module component units 16, 20 are designed as module component units separate from the first module component unit 14, meaning these module component units comprise an independent range of functions independent of the first module component unit 14.

The second and the third module component units 16, 20 each comprise, similar to the first module component unit 14, several environment sensors, in this case the at least one second environment sensor 17 and/or the at least one third environment sensor 21 as well as their own casing 23. Furthermore, the second and the third module component unit 16, 20 each comprise a temperature-control apparatus 25 having a cooling-air inlet 26 and a cooling-air outlet 27 as well as a cleaning apparatus 28 having at least one cleaning nozzle 29.

In the exemplary embodiments shown, a lidar sensor preferably looks through the viewing area 24 in each case, whereas another environment sensor, for example a camera, is preferably inserted through an opening in the corresponding casing 23 below the respective lidar sensor.

The invention claimed is:

1. A sensor module to be mounted on a motor vehicle in a length-adaptive manner, the sensor module comprising:

a first module component unit having at least one first environment sensor, at least one second module component unit having at least one second environment sensor, and at least one intermediate element, via which the first module component unit is coupled to the second module component unit, the intermediate element being configured to be adjustable in length as a function of a mounting position on the motor vehicle, wherein the sensor module has a third module component unit, which comprises at least one third environment sensor, and at least one other intermediate element, via which the first module component unit is coupled to the third module component unit, the other intermediate element being configured to be adjustable in length as a function of a mounting position on the motor vehicle.

2. The sensor module according to claim 1, wherein the sensor module is essentially beam-shaped, and has a length L, which is larger than its width B, and is adaptively adjustable along its length L.

3. The sensor module according to claim 1, wherein the at least one intermediate element is telescopically adjustable in length and is adaptively adjustable in this manner to a vehicle dimension y as a function of the mounting position on the motor vehicle.

4. The sensor module according to claim 1, wherein the second module component unit is disposed at an end face of the intermediate element.

5. The sensor module according to claim 1, wherein the first module component unit is disposed in a central and/or middle area relative to length L of the sensor module, the intermediate element and the other intermediate element each extending away from the first module component unit in length L, the second module component unit being disposed on an end face of the intermediate element and the third module component unit being disposed on an end face of the other intermediate element.

6. The sensor module according to claim 1, wherein the at least one second and/or the at least one third environment sensor is directed essentially in movement direction x and/or essentially in the opposite direction and/or essentially along length L of sensor module.

7. The sensor module according to claim 1, wherein the at least one first environment sensor and/or the at least one second environment sensor and/or the at least one third environment sensor comprises at least one lidar sensor and/or at least one ultrasonic sensor and/or at least one camera and/or at least one multidirectional camera and/or at least one radar sensor.

8. The sensor module according to claim 1, wherein the first module component unit and/or the second module component unit and/or the third module component unit comprise at least one temperature-control apparatus and/or at least one control apparatus and/or at least one amplifier and/or at least one optical apparatus and/or at least one cleaning apparatus and/or at least one de-icing apparatus and/or at least one anti-fog apparatus and/or at least one illumination apparatus and/or at least one antenna and/or at least one communication apparatus and/or at least one energy production apparatus and/or at least one energy storage apparatus and/or another electric and/or electronic and/or mechanical components.

9. The sensor module according to claim 1, wherein the sensor module comprises at least one electric and/or electronic connection, which extends between the first and/or the second and/or the third module component unit, the intermediate element and/or the other intermediate element forming an interconnection which is flexible and/or adjustable in length.

10. The sensor module according claim 1, wherein the sensor module comprises at least one drive apparatus configured to displace the intermediate element and/or the other intermediate element telescopically in length.

11. The sensor module according to a claim 1, wherein the sensor module comprises at least one snap device and/or at least one fixation device, which are configured to fixate the intermediate element and/or the other intermediate element in length.

12. A motor vehicle, comprising at least one sensor module according to claim 1, the at least one sensor module being mounted in a mounting position on the motor vehicle, the intermediate element being adjusted in such a manner in length L of the sensor module that the sensor module is adjusted to a vehicle dimension in the mounting position width.

13. The sensor module according to claim 9, wherein the at least one electric and/or electronic connection comprises a plurality of cables.

14. The sensor module according to claim 9, wherein the interconnection is a cable guide, and/or a line guide and/or a channel guide.

* * * * *